UNITED STATES PATENT OFFICE.

EDWARD CONWAY, OF DAYTON, OHIO.

IMPROVEMENT IN ALLOYS FOR DENTAL PLATES.

Specification forming part of Letters Patent No. 146,233, dated January 6, 1874; application filed June 3, 1873.

*To all whom it may concern:*

Be it known that I, EDWARD CONWAY, of Dayton, Montgomery county, Ohio, have invented a new and Improved Alloy for Making Teeth-Plates and other plates, which will not corrode by the action of the atmosphere or the acids of the mouth; and I declare that the following is a full and accurate description thereof.

The nature of my invention consists in purifying and fusing together the following-named metals, in the following proportions and in the following manner, namely, platinum, gold, silver, bismuth, tin, and lead, viz., one scruple of platinum, one scruple of gold, one scruple of silver, five ounces of bismuth, nine ounces of tin, and two of lead. All these metals should be perfectly pure. The bismuth, tin, and lead should be well refined before melting together. I melt each separately in a clean iron ladle, and, when melted, pour on a clean marble slab. I repeat the melting and pouring until there is no dross left of either the bismuth, tin, or lead. When this is done, I melt each separately again, and pour each separately into a clean glass dish containing pure lemon-juice. Repeat this last process three times, taking the cold metal from the acid and melting it again without washing. I then melt each of the three metals, bismuth, tin, and lead, again separately, and pour them on the marble slab, when they will be clean and pure from all impurities. I then take one scruple of platinum filings, one scruple of gold filings, and one scruple of silver filings; I put them in a clean iron ladle, and place upon them five ounces of bismuth thus purified and refined. I heat this till the whole mass becomes melted, shaking it gently. I then add nine ounces of purified tin, and, lastly, two ounces of lead; or those proportions of the six metals may be used. When the mass is well fused, I pour the whole mass upon a marble slab. This melting and pouring should be repeated twice, when the metal is finished by melting it and pouring it into an iron mold, forming it into an ingot. This forms an alloy easily fusible, tasteless, not deleterious to the health, and with which teeth-plates may be made and attached to the teeth permanently and effectually by simply melting the alloy and pouring it into a plaster cast, commonly used by dentists in vulcanizing a set of rubber teeth.

What I claim as my invention, and desire to secure by Letters Patent, is—

An alloy composed of platinum, gold, silver, bismuth, tin, and lead, in substantially the proportions and for the purposes specified herein.

EDWARD CONWAY.

Witnesses:
JOHN HOWARD,
JAMES LINDEN.